United States Patent
Holt et al.

(10) Patent No.: US 7,362,374 B2
(45) Date of Patent: Apr. 22, 2008

(54) VIDEO INTERLACING USING OBJECT MOTION ESTIMATION

(75) Inventors: Gary R. Holt, Bell Canyon, CA (US); Edward R. Ratner, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 594 days.

(21) Appl. No.: 10/646,334

(22) Filed: Aug. 22, 2003

(65) Prior Publication Data

US 2004/0174459 A1 Sep. 9, 2004

Related U.S. Application Data

(60) Provisional application No. 60/407,390, filed on Aug. 30, 2002.

(51) Int. Cl.
H04N 7/01 (2006.01)
H04N 11/20 (2006.01)
H04N 5/14 (2006.01)
H04N 9/64 (2006.01)
G06K 9/40 (2006.01)

(52) U.S. Cl. .............. 348/446; 348/459; 348/699; 348/701; 382/275

(58) Field of Classification Search ........... 348/440.1, 348/446, 459, 699–701; 382/275
See application file for complete search history.

(56) References Cited

U.S. PATENT DOCUMENTS

| 4,298,888 | A | | 11/1981 | Colles et al. |
| 5,208,667 | A | * | 5/1993 | Saunders .................. 348/452 |
| 5,329,309 | A | * | 7/1994 | Dorricott et al. ............ 348/97 |
| 5,353,119 | A | * | 10/1994 | Dorricott et al. .......... 348/446 |
| 5,526,053 | A | * | 6/1996 | Dorricott et al. .......... 348/443 |
| 5,661,525 | A | * | 8/1997 | Kovacevic et al. ........ 348/452 |
| 5,784,115 | A | | 7/1998 | Bozdagi |
| 5,793,443 | A | * | 8/1998 | Aoki et al. ................. 348/699 |
| 5,822,007 | A | * | 10/1998 | Knee et al. ............. 348/416.1 |
| 5,872,858 | A | * | 2/1999 | Kamada et al. ............ 382/107 |
| 5,978,034 | A | * | 11/1999 | Hosaka .................. 375/240.16 |
| 6,058,143 | A | * | 5/2000 | Golin .................... 375/240.16 |
| 6,067,120 | A | * | 5/2000 | Horikawa et al. .......... 348/447 |
| 6,192,079 | B1 | * | 2/2001 | Sharma et al. ......... 375/240.16 |
| 6,192,080 | B1 | * | 2/2001 | Sun et al. .............. 375/240.16 |
| 6,259,732 | B1 | * | 7/2001 | Lee .......................... 375/240 |
| 6,269,484 | B1 | | 7/2001 | Simsic et al. |
| 6,272,179 | B1 | * | 8/2001 | Kadono ................. 375/240.16 |
| 6,289,132 | B1 | * | 9/2001 | Goertzen .................... 382/240 |
| 6,307,888 | B1 | * | 10/2001 | Le Clerc ............... 375/240.29 |

(Continued)

OTHER PUBLICATIONS

MPEG-4: Audio/Video and Synthetic Graphics/Audio for Mixed Media, Signal Processing: Image Communications 9 (1997)433-463, Doenges et al.*

*Primary Examiner*—Brian P. Yenke
(74) *Attorney, Agent, or Firm*—Okamoto & Benedicto LLP

(57) ABSTRACT

One embodiment disclosed relates to the use of object motion estimation to interlace a progressive video sequence. One of a plurality of consecutive frames is segmented and motion vectors for each segment are determined though object motion estimation. Interpolated motion vectors are used to construct at least one intermediate frame, and interlaced fields are extracted from the new sequence of frames that includes intermediate frames. An interlaced sequence with smooth, incremental motion is thus constructed from a progressive video sequence.

10 Claims, 9 Drawing Sheets

U.S. PATENT DOCUMENTS

| | | |
|---|---|---|
| 6,442,203 B1 | 8/2002 | Demos |
| 6,493,041 B1 * | 12/2002 | Hanko et al. ............... 348/699 |
| 6,580,812 B1 * | 6/2003 | Harrington ................. 382/107 |
| 6,625,333 B1 * | 9/2003 | Wang et al. ................ 382/300 |
| 6,661,464 B1 | 12/2003 | Kokkosoulis et al. |
| 6,750,900 B1 * | 6/2004 | Cok .......................... 348/169 |
| 6,778,221 B1 * | 8/2004 | Nishioka et al. ............ 348/459 |
| 6,785,329 B1 * | 8/2004 | Pan et al. .............. 375/240.08 |
| 6,799,168 B1 * | 9/2004 | He et al. ....................... 706/8 |
| 6,804,303 B2 * | 10/2004 | Kim ...................... 375/240.16 |
| 6,822,691 B1 * | 11/2004 | Kim et al. .................. 348/452 |
| 6,847,405 B2 * | 1/2005 | Hsu et al. ................... 348/452 |
| 6,870,945 B2 * | 3/2005 | Schoepflin et al. ......... 382/103 |
| 6,885,706 B2 * | 4/2005 | Hsu ....................... 375/240.24 |
| 6,900,846 B2 * | 5/2005 | Lee et al. ................... 348/459 |
| 6,928,191 B2 * | 8/2005 | Goertzen .................... 382/240 |
| 6,937,655 B2 * | 8/2005 | De Haan et al. ........ 375/240.12 |
| 6,940,557 B2 * | 9/2005 | Handjojo et al. ........... 348/452 |
| 6,992,725 B2 * | 1/2006 | Mohsenian ................. 348/448 |
| 7,003,061 B2 * | 2/2006 | Wilensky .................... 375/360 |
| 2003/0194151 A1 * | 10/2003 | Wang et al. ................ 382/300 |
| 2004/0091046 A1 * | 5/2004 | Akimoto et al. ........ 375/240.12 |
| 2004/0151250 A1 * | 8/2004 | Witterbrood et al. .. 375/240.16 |
| 2004/0239762 A1 * | 12/2004 | Porikli et al. ............... 348/169 |

* cited by examiner

Object Motion Estimation

Segmented Frame

Segment Position in Next Frame

Intermediate Frame Interpolation

VIDEO INTERLACING USING OBJECT MOTION ESTIMATION

CROSS-REFERENCE TO RELATED APPLICATION

The present application claims the benefit of U.S. Provisional Application No. 60/407,390, entitled "Video Interlacing Using Object Motion Estimation", filed by Gary R. Holt and Edward R. Ratner on Aug. 30, 2002, the disclosure of which is hereby incorporated by reference.

BACKGROUND OF THE INVENTION

1 Field of the Invention

The present invention relates generally to the interlacing of progressive scan video data and particularly to the use of object motion estimation to interlace progressive scan video data.

2 Description of the Background Art

A device for displaying a video signal, such as for instance a television set or a computer monitor, typically consists of an array of pixel locations, often arranged on a rectangular grid. The device colors various pixel locations to display snapshot images, and these colors can change rapidly over time as a succession of images is transmitted. This rapid succession of images appears as a continuous moving picture to a human observer. The information contained in the video signal is relayed to these pixel locations on the display device in some temporal order so as to create the best video quality possible. For instance, in the case of television, a cathode ray tube is used to fire electrons at particular pixel locations on an excitable phosphorescent surface. The electron beam is very rapidly deflected to send the relevant information to each pixel location during a sweep through all pixel locations so that the entire display is covered in a fraction of one second. The color of the excited pixel locations persists for a finite period of time as the ray completes each scan.

During the development of television technology, a number of canonical choices were made regarding the temporal order in which display pixels receive their electrical impulses. The electron beam canonically traverses the rectangular array in raster-scan order, meaning it crosses each row from left to right and it proceeds top to bottom through all rows. In the 1930s and '40s as television matured, the demand for higher display resolution outpaced the electrical machinery of the day. Since the electron beam of a cathode ray tube could not be deflected fast enough to fill an entire higher resolution display in the desired time increment without greatly increasing costs, the decision was made to skip every other row in the array and thus to fill only half of it in one raster scan, then return to the top and perform a second raster scan for the previously omitted rows. This display method is commonly referred to as interlacing a video sequence.

In an interlaced display, each resultant image of a single one of the two interlaced scans is referred to as a "field" (as opposed to the entire "frame" presented during progressive scan). By convention, the two fields that together fill the pixel array are referred to herein as an odd field and an even field, representing the odd numbered rows and the even numbered rows, respectively. FIG. 1 illustrates the division of an image into an odd field and an even field. Full frame 100 consists of a lightly shaded background and two overlapping gray rectangles. The division of the frame into rows is depicted, and the width of the rows is enlarged beyond typical pixel width for illustrative purposes. Odd field 110 contains only the image data contained in the odd rows, while even field 120 contains only the image data contained in the even rows. If overlaid, the odd field 110 and the even field 120 will reconstitute the full frame 100.

Since the second scan occurs later in time, the pixels hit in the second scan actually display an image that occurs slightly later in time than the image depicted by the first scan. In the case of a video sequence containing motion, this fact implies that the later of two fields will actually sometimes display objects in different positions than in the previous field.

As electronic equipment used for television matured in later decades, the ability to scan through the entire array of pixels at each time increment developed. The term progressive scan refers to the process of filling the entire array of pixels to create a complete video frame with each pass of the electron beam. Modern computer monitors, as one prototypical example, use progressive scan technology.

An interlaced signal contains half of the information for each field that is contained in a single frame of a progressive signal. For this reason, quality comparisons between the two presentation formats are typically made between a progressive signal and an interlaced signal with twice as many fields per second. For instance, a progressive video containing 30 frames per second (standard in the U.S.) corresponds to an interlaced video containing 60 fields per second. In such comparisons, interlaced signals have the advantage of providing smoother motion since there are more incremental movements per second, but they typically suffer from some blurry artifacts caused by the offset fields that do not appear in a progressive video. Of course 60 frames per second of progressive video (at the same individual image quality) will look better than 60 fields per second, but bandwidth constraints render such a progressive frame rate impractical for many purposes.

The presence of these two display technologies can present compatibility difficulties. For instance, most video sequences prepared for television display are recorded in an interlaced format which is not suited for display on a progressive scan device. However, a progressive scan format is desirable or necessary for a number of purposes, including display on progressive scan devices, video processing, and certain schemes for video compression. The need often arises to display a video sequence that is recorded in progressive scan on an interlaced display device, so converting between the two standards for video display is important. The process of converting a progressive scan video sequence to an interlaced video sequence is herein referred to as interlacing.

The primary known methods for interlacing a progressive sequence consist of line dropping and frame separation. Line dropping is the process of dropping even or odd lines from alternate frames in a progressive sequence so that only odd or even lines remain. For instance, if a 60 frame per second progressive sequence is to be converted into a 60 field per second interlaced sequence, then line dropping is a suitable option. Half of the lines are dropped from each frame so that only a single field remains, and this is done so that fields alternate between odd and even. But when the number of frames per second in the progressive sequence is less than the desired number of fields per second, line dropping is no longer useful.

FIG. 2 is an illustration of interlacing by line dropping. Frames 200 and 202 are two consecutive frames from a progressive video sequence depicting the rightward motion of a gray disk. Field 204 contains only the odd lines from frame 200 (so the even lines have been dropped), while field 206 contains only the even lines from frame 202 (so the odd lines have been dropped). Fields 204 and 206 represent consecutive fields from the interlaced sequence.

Frame separation refers to the process of subdividing each frame into two component fields (odd lines and even lines) and staggering the fields temporally to generate an interlaced format. An implementation of interlacing by frame separation is discussed, for example, in U.S. Pat. No. 4,298,888 to Joseph H. Colles et al. This method applies most directly when the desired interlaced field rate is twice the progressive frame rate, for instance when a 30 frame per second progressive sequence is converted to a 60 field per second interlaced sequence. However, because pairs of fields, which are displayed at slightly different times, are extracted from the same moment in time depicted in an original frame, no motion is represented between these fields. Hence this method fails to achieve the advantage of smoother motion that is associated with an interlaced format. Instead, motion only occurs between every other pair of fields, which can result in a somewhat jerky visual effect.

FIG. 3 is an illustration of interlacing by frame separation. Frames 200 and 202 are the same consecutive frames from a progressive video sequence shown in FIG. 2. Field 304 contains the odd lines from frame 200, while field 306 contains the even lines from frame 200. Frame 202 is separated into its own pair of even and odd fields (not depicted). Thus the interlaced sequence contains two fields separated from each frame of the progressive sequence.

SUMMARY

Previously disclosed methods for interlacing a progressive video sequence fail to adequately represent the incremental motion of image objects between consecutive fields. This failure is most apparent when the desired interlaced field rate is greater than the progressive source frame rate. It is therefore an object of the present invention to provide an interlacing method that properly represents the smooth motion of objects between consecutive fields and that thus provides an improved visual quality in the resulting interlaced output.

An embodiment of the invention relates to a method for interlacing a progressive video sequence to produce an interlaced video sequence. Object motion estimation between frames is used to interpolate the motion offset of at least one field of the interlaced output.

In accordance with one specific embodiment of the method, a progressive sequence with N frames per second is converted into an interlaced sequence with 2N frames per second. Two consecutive frames from the progressive sequence are compared to determine the motion of objects between these frames. The first frame is segmented into segments representing constituent image objects, and these segments are matched to areas in the second frame to determine segment motion vectors. Motion vectors may include horizontal and vertical displacements as well as other data expressing rotation, scaling, or deformation. These motion vectors expressing frame-to-frame motion are used to interpolate the motion of objects between a first field and a second field over a shorter time span. An intermediate frame is constructed using the interpolated motion data for segments and a scheme for filling exposed areas. A first field is then extracted from the first frame and a second field of opposite parity is extracted from the constructed intermediate frame. The process continues by taking the next pair of consecutive frames from the progressive sequence and repeating the same operations to produce an interlaced sequence consisting of two fields for every frame in the progressive source sequence.

Another embodiment of the invention relates to an apparatus for interlacing a progressive video sequence to produce an interlaced video sequence. The apparatus includes at least a frame buffer and a processor coupled thereto. The frame buffer is configured to store a plurality of consecutive progressive frames. The processor is configured to take at least two of the consecutive frames from the frame buffer and apply object motion estimation to generate at least one intermediate frame.

BRIEF DESCRIPTION OF THE DRAWINGS

A further understanding of the nature and advantages of the invention disclosed herein may be realized by reference to the remaining portions of the specification and the attached drawings.

To aid in understanding, identical reference numerals have been used wherever possible to designate identical elements in the figures.

DETAILED DESCRIPTION OF THE SPECIFIC EMBODIMENTS

Figure 1:
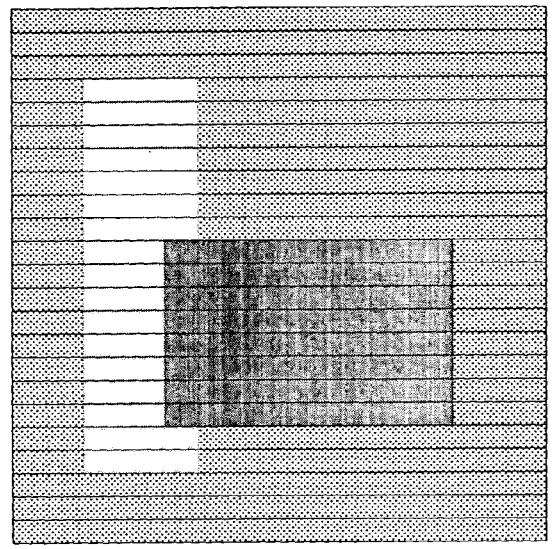
FIG. 1 is an illustration of the division of a still image frame into an odd image field and an even image field.
Figure 1:
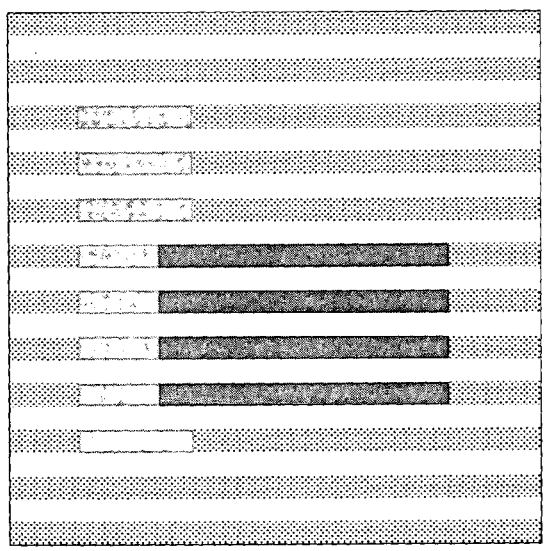
Figure 1:
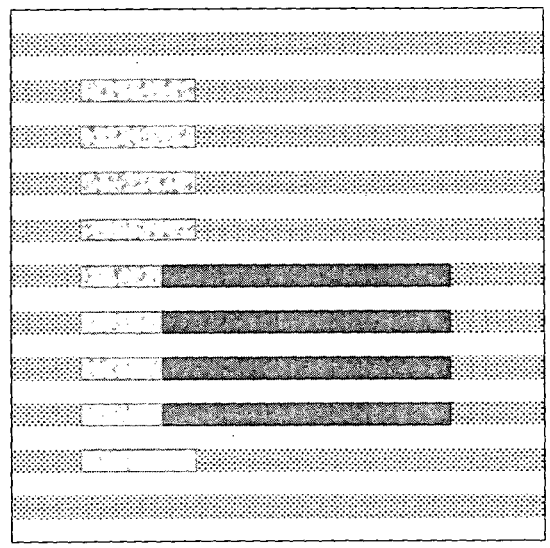
Figure 2:
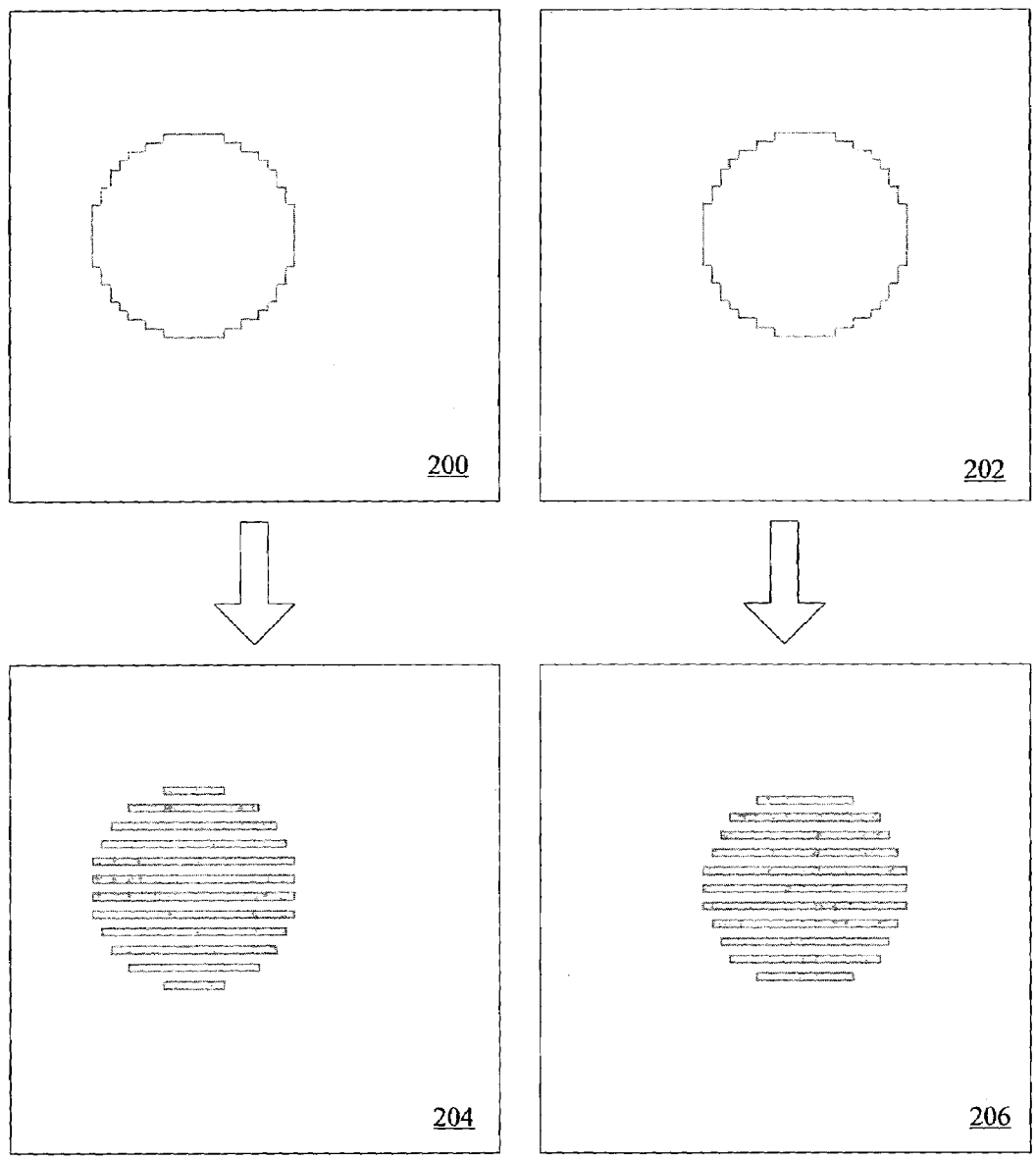
FIG. 2 is an illustration of interlacing by line dropping.
Figure 3:
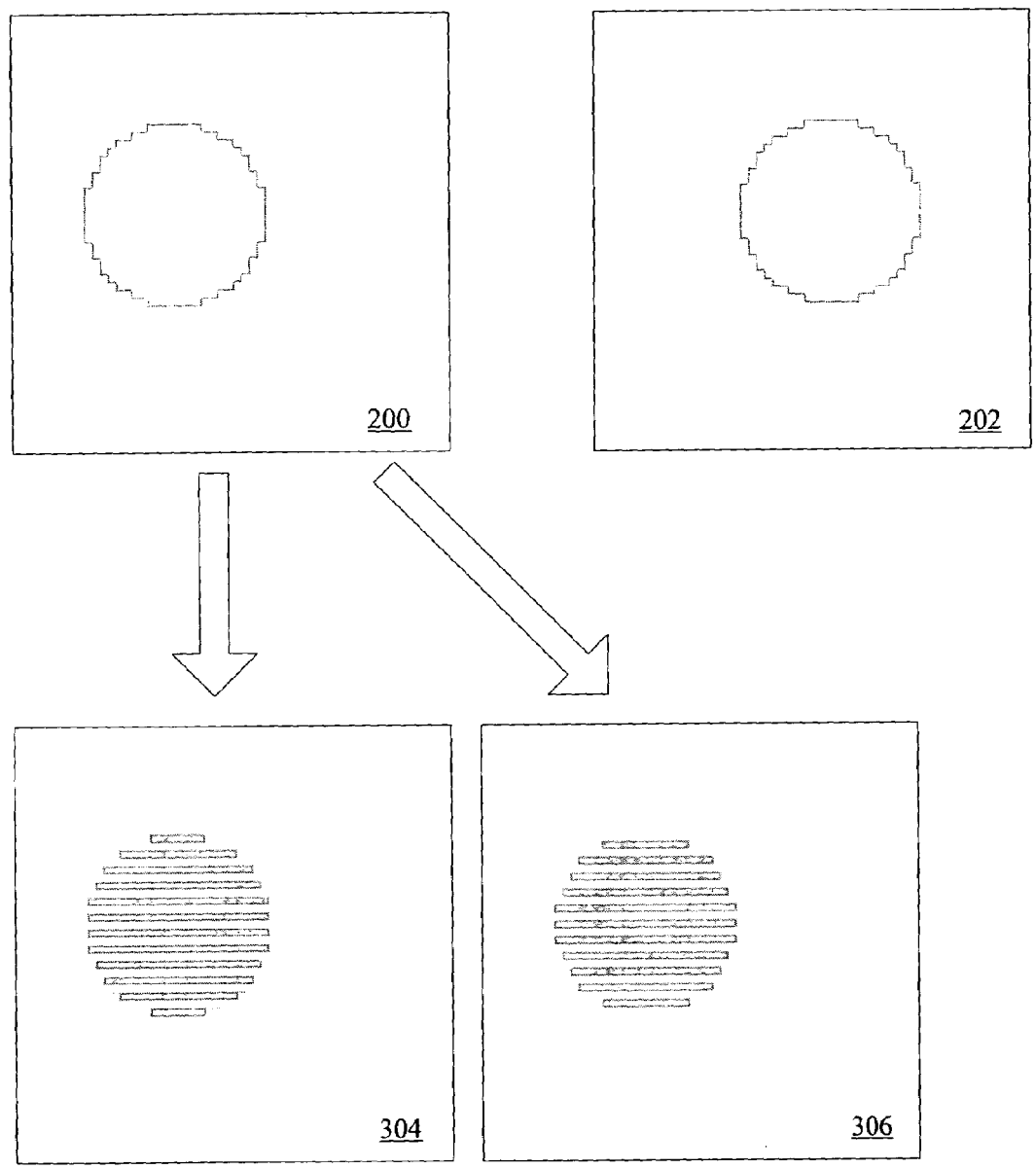
FIG. 3 is an illustration of interlacing by frame separation.

The present application relates to video processing. Other applications related to video processing include the following commonly-assigned applications, the disclosures of which are hereby incorporated by reference in their entirety.

U.S. patent application Ser. No. 09/550,705, filed Apr. 17, 2000 and titled "Method and Apparatus for Efficient Video Processing," hereinafter 'Prakash I.'

U.S. patent application Ser. No. 09/591,438, filed Jun. 9, 2000 and titled "Method and Apparatus for Digital Image Segmentation," hereinafter 'Prakash II.'

U.S. patent application Ser. No. 09/912,743, filed Jul. 23, 2001 and titled "Motion Matching Method," hereinafter 'Prakash III.'

U.S. patent application Ser. No. 09/922,299, filed Aug. 3, 2001 and titled "Method of Determining Relative Z-Ordering in an Image and Method of Using Same," hereinafter 'Prakash IV.'

U.S. patent application Ser. No. 10/027,924, filed Dec. 19, 2001 and titled "Method and Apparatus for Deblurring and Reblurring Image Segments," hereinafter 'Ratner I.'

U.S. patent application Ser. No. 10/062,574, filed Jan. 31, 2002 and titled "Method and Apparatus for Partitioning an Arbitrarily-Shaped Area," hereinafter 'Holt I.'

1 Introduction

The disclosed method and apparatus can interlace a progressive video sequence in a way that accurately represents object motion between fields that are displayed at different moments in time. Spatial, structural, and temporal information may be all used to create image fields out of two or more consecutive progressive image frames. Image objects may be identified via segmentation, and the motion of these segments between image frames may be estimated. In one embodiment, interframe motion estimates are used to interpolate motion between a first field and a second field, where the first field occurs at the same time as the first frame and the second field is temporally ordered between the first frame and the second frame in the pair of consecutive progressive frames. Interpolated motion vectors associated with the segments are used to construct an intermediate frame. Additional processing may be used to fill exposed areas and to improve object.boundaries in the constructed intermediate frame. A first field is extracted from the first frame and a second field is extracted from the constructed intermediate frame, resulting in two ordered interlaced fields. The process is repeated for subsequent pairs of frames to produce an interlaced video sequence.

One typical application of the present invention arises in the reinterlacing of standard interlaced television sequences that have been deinterlaced (i.e. converted from interlaced format to progressive format), for instance for compression or for video processing. In this application, an interlaced sequence consists of two fields: one for the odd rows of the pixel array and one for the even. Note, however, that the inventive concept extends to other forms of interlacing. For instance, a signal may be interlaced into more than two fields. One with ordinary skill in the art may readily apply the disclosed invention to this situation. In another example, the fields into which a video signal is interlaced may not consist of alternate rows of pixels but may follow a different geometric pattern. Again, one with ordinary skill in the relevant art may apply the disclosed invention to such situations. The remainder of the specification primarily discusses a preferred embodiment, which applies to the interlacing of a progressive sequence into an interlaced sequence with two (even and odd) fields. This discussion should be interpreted as illustrative of the details and advantages of the preferred embodiment and some alternatives but should not be construed as limiting the invention itself.

2 Detailed Description of the Drawings

2.1 Interlacing Method

Figure 7:
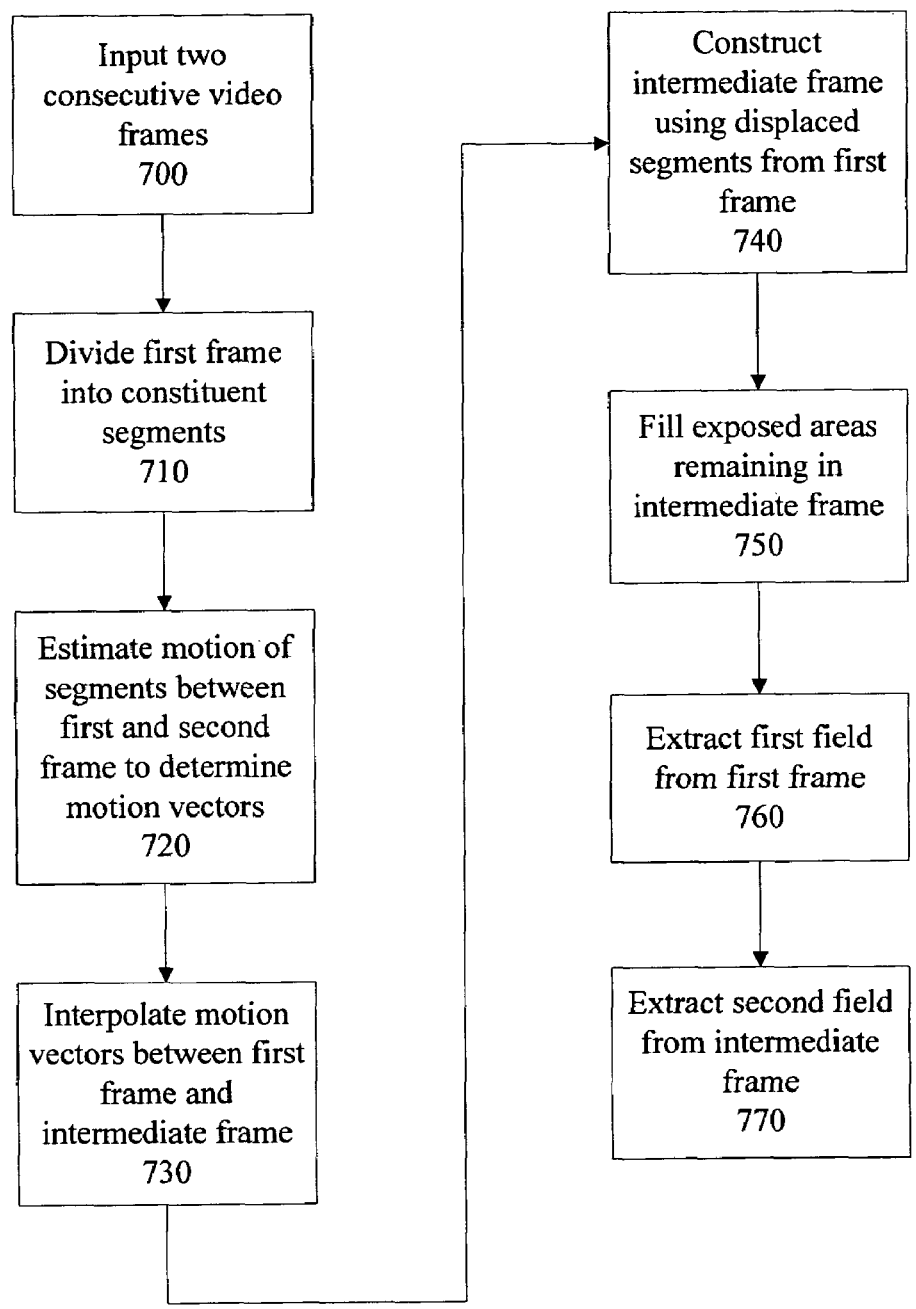
FIG. 7 is a flow chart summarizing the steps of a preferred embodiment method for interlacing.

FIG. 7 is a flow chart summarizing the major steps involved in the preferred embodiment of the invention. This embodiment applies to the conversion of a progressive video sequence into an interlaced sequence consisting of two fields (odd and even). If the frame rate of the input progressive sequence is N frames per second, then this embodiment can be used to produce an interlaced sequence with a field rate of 2N fields per second with approximately the same visual quality as the original progressive sequence.

In step 700, two consecutive frames of the progressive sequence are taken as inputs. In step 710, the first of these two image frames is subdivided into segments representing constituent objects and parts of objects in the image. Any method of segmentation may be employed here so long as it produces a plurality of segments that accurately depict consistent objects or parts of objects within the image. In the current implementation, the segmentation method disclosed in Prakash II, cited above, is used. In an alternative embodiment, the later of the two frames is segmented and these segments are matched in the earlier frame in alternative later steps. The direction of motion estimation is not essential, but it is important that motion of segments representing image objects is estimated in the next step.

In step 720, the motion of each segment between the earlier frame and the later frame is estimated using some motion estimation procedure. (In the aforementioned alternative embodiment, reverse motion between the later frame and the earlier frame is estimated.) This procedure returns a motion vector for each segment unless no suitably matching region is found in the next frame. In this case, no motion vector is found for the given vector. Note that any suitable motion estimation procedure for arbitrary segments may be used at this step. One such motion estimation procedure is disclosed in Prakash III, cited above. Motion estimation for segments is discussed further below with reference to FIG. 4.

In step 730, the motion vectors found in the previous step are used to interpolate motion vectors expressing the motion of segments between the first frame and an intermediate frame (located temporally between the first and second frames). Such an intermediate frame is constructed in order to extract from it a field that is temporally situated between the first and second frames. Preferably, the intermediate frame should be halfway between the timestamps of the first frame and the second frame. In this case, motion vectors from the previous step can be halved (in each coordinate direction) in order to interpolate motion vectors for the intermediate frame. Interpolation of motion vectors for the intermediate frame is discussed further below with reference to FIG. 5.

In step 740, the interpolated motion vectors of the previous step and the segments from the first frame are used to construct the intermediate frame. Segments from the first frame are displaced according to their respective interpolated motion vectors. Some additional processing may be used in constructing the intermediate frame. For instance, since displaced segments may overlap, it may be necessary to determine the Bordering, or depth ordering, of various segments. Z-ordering may be determined for example using the method outlined in Prakash IV, referenced above. Also, it may be preferable to remove blurring or blending near segment boundaries prior to displacing them and then to add blur again to the displaced segments' boundaries to create a more natural perceptual effect. Removing and adding blur may for instance be carried out according to the teachings of Ratner I, referenced above. In one embodiment, some of this additional processing is postponed until after the next step.

Note that because of segment displacements, overlaps, and perhaps even unmatched segments, some small areas may be left unfilled in the constructed intermediate frame. In step 750, some procedure is used to fill these exposed areas. Since no original frame in the progressive sequence exists at the time corresponding to this intermediate frame, a best guess method is used to fill exposed areas. In the preferred embodiment, elongated exposed areas are first broken into smaller pieces that are easier to match with areas in the surrounding frames. A motion vector for each resulting exposed area is then inferred from the motion of neighboring segments, and this motion vector is used to fill the area with data from either the previous or the next frame. This process and some alternatives are described in greater detail in subsection 2.5. 'Exposed Areas' with reference to FIGS. 6*a* and 6*b*.

In step 760, a first field is extracted from the first frame. For example, an odd field might be extracted from the first frame by line dropping.

In step 770, a second field is extracted from the newly constructed intermediate frame. For example, an even field might be extracted from the intermediate frame by line dropping.

The pair of fields produced in steps 760 and 770 represents the same amount of information as the first frame in the pair of consecutive frames inputted from the progressive sequence. The above steps may be repeated for other consecutive pairs of frames from the progressive sequence to produce an interlaced video sequence. If each consecutive pair of frames from the progressive sequence is sequentially used to produce two fields of opposite parity as above, then the N-frames-per-second progressive sequence will be converted into a 2N-fields-per-second interlaced sequence. In alternative embodiments, the pairs of frames selected for the above process and the resulting ratio of progressive frames to interlaced fields may differ.

2.2 Segment Motion Estimation

Figure 4:
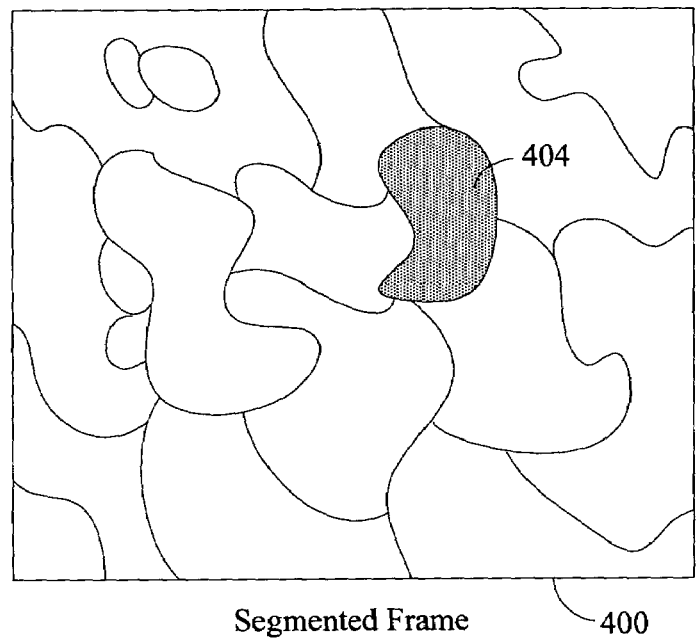
FIG. 4 is an example of object motion estimation.
Figure 4:
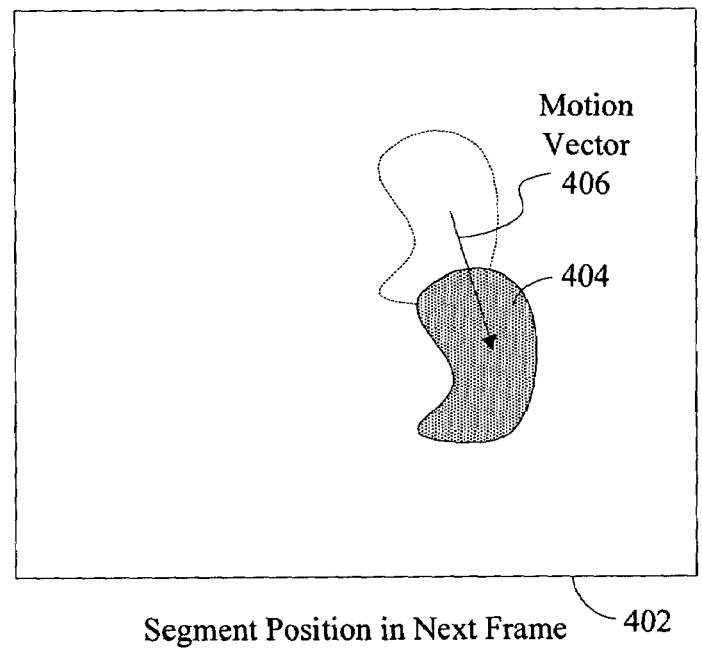

FIG. 4 illustrates the process of determining a motion vector, or estimating motion, for a segment in a segmented frame, as occurs in step 720 of the preferred embodiment. Frame 400 is segmented into a plurality of segments, of which segment 404 is highlighted. Frame 402 occurs soon after frame 400 in a video sequence, so it is likely to contain many of the same objects as frame 400. Some objects, however, may have moved or deformed during the time elapsed between frames 400 and 402. The pixels comprising segment 404 are compared to the corresponding set of pixels of same size and shape in a plurality of locations within 402. For instance, typically a rectangular search area extending K pixels horizontally and M pixels vertically, centered around the location of segment 404 in frame 400, might be used. The location providing the best match to the pixel data in segment 404 is located. Motion vector 406 expresses the horizontal and vertical displacement between the original location of segment 404 in frame 400 and the best matching new location in frame 402. This process may be repeated for each segment in frame 400 to determine a motion vector for each segment. A matching threshold may be used so that segments that fail to adequately match any location within frame 402 are not assigned motion vectors at all.

More advanced motion estimation techniques may also take into account the rotation, sheer, contraction, expansion, or other deformation of segments between the two frames. When these other parameters are allowed to vary in the search for a matching area in the later frame, the motion vector expressing the best match for a segment will include not only horizontal and vertical displacement, but also information regarding rotation, sheer, contraction, expansion, and/or any other relevant deformation data.

2.3 Resolving Wrong Matches

A problem arises in interlacing by motion estimation when a motion estimate does not accurately reflect the motion of an object. For instance, an object in an earlier frame may be matched to an area belonging to a different object in the later frame because the two regions happen to be similar in color. In this case, if the motion vector is halved to interpolate motion at an intermediate frame, the object from the previous frame may be placed in a completely wrong position in the interpolated frame. Such bad matching is relatively common in block-based motion estimation strategies, such as the block-matching approach used by the MPEG series of video compression standards to predict some frames from reference frames, since small square blocks may find their best color matches in arbitrary parts of the other frame. An object-based motion estimation strategy substantially reduces the likelihood of bad matches since segments of arbitrary size and shape that represent real objects are used and thus structural information in addition to local color is taken into account during motion estimation. Nonetheless, wrong matches are possible and they can detrimentally affect the quality of the interlaced sequence. It is thus preferable to cull these wrong matches whenever possible to prevent erroneous placement of segments in the intermediate frame.

In the preferred embodiment, the following measures are taken to identify wrong matches and to replace the erroneous motion vectors with better estimates. A segment's motion vector resulting from the motion estimation stage is compared to the motion vectors of its neighbors. If the neighbors all move consistently (within some threshold range) but the given segment's motion differs significantly from this consistent neighbor motion, then the given segment's motion vector is replaced with a vector representing the consistent motion of its neighbors.

In another embodiment, temporal data is used to determine whether the motion vector for a segment is wrong. The motion vector for the segment is compared to the motion vectors for the same set of pixels in the past and in the future. If the current motion vector is substantially inconsistent with past and future motion, then it is rejected as a wrong motion estimate. In this case, it may be replaced with an estimate based on past and future motion of the segment, or it may be replaced with an estimate based on the current motion of neighboring segments.

2.4 Intermediate Frame Interpolation

Figure 5:
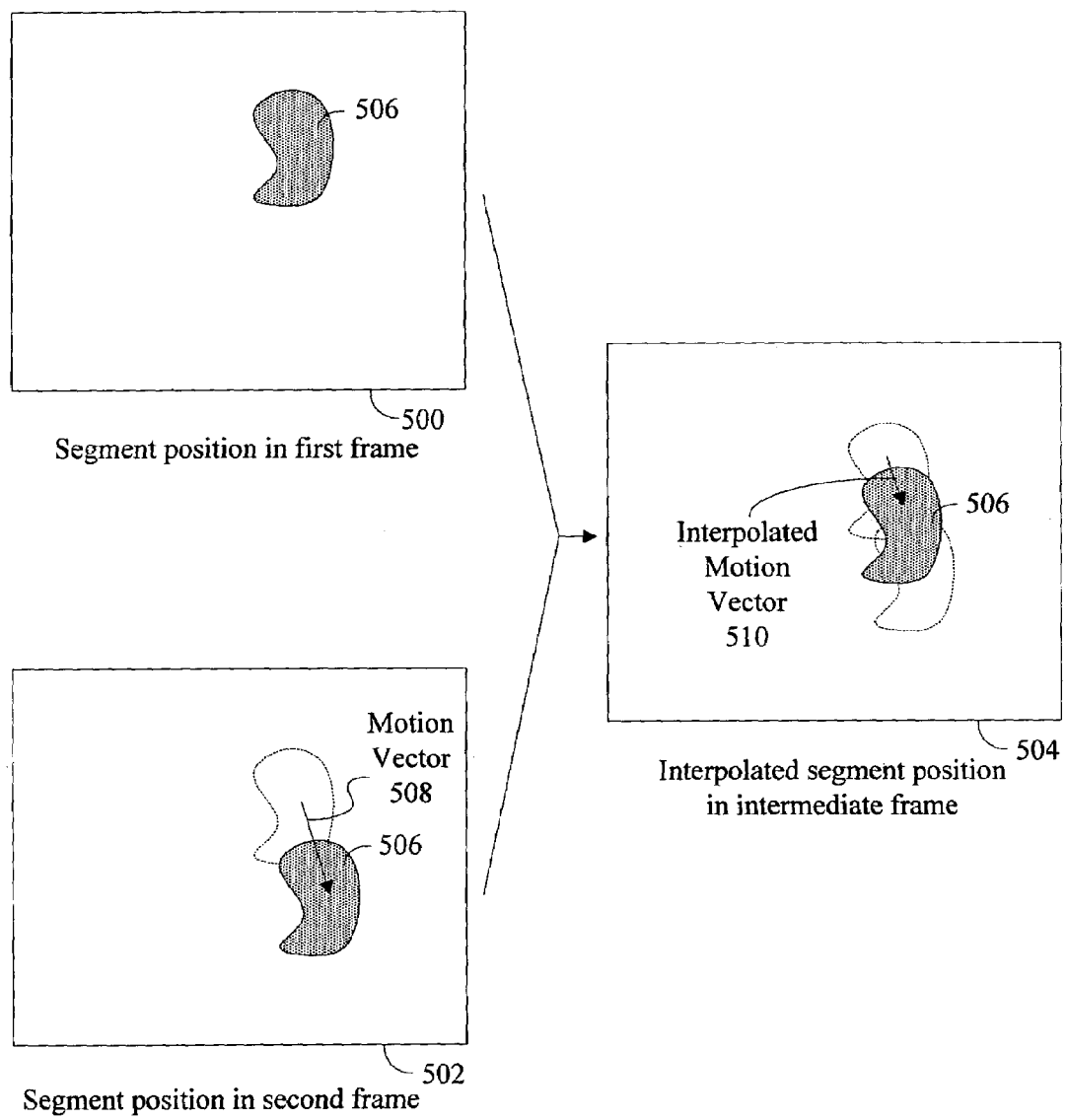
FIG. 5 is an example illustrating the interpolation of segment motion between a first frame and an intermediate frame.

FIG. 5 is an example illustrating the interpolation of a motion vector for a segment between a first frame and an intermediate frame, as occurs in step 730 of the preferred embodiment. Frame 500 and frame 502 are two consecutive frames in a progressive video sequence. Segment 506 is highlighted in frame 500. Segment 506 is also shown in a new position in frame 502, indicating the portion of frame 502 that best matches segment 506 in frame 500. The broken-line outline in frame 502 is a copy of the original position of segment 506 in frame 500. Motion vector 508 indicates the displacement of segment 506 between its position in frame 500 and its new best-matching position in frame 502.

Frame 504 is an intermediate frame that is to be constructed to occupy a time between the timestamps of frames 500 and 502. The time elapsed between frame 500 and frame 504 is less than the time elapsed between frame 500 and frame 502, so segment 506 should not move as far between frame 500 and frame 504 as it does between frame 500 and frame 502. If the total time elapsed between frame 500 and frame 502 is small (for instance $\frac{1}{30}_{th}$ of a second as in a typical video sequence), and if the intermediate frame 504 is taken to be temporally halfway between frame 500 and frame 502, then half of the motion vector 508 is a good estimate of the motion of segment 506 between frame 500 and frame 504. Interpolated motion vector 510 is thus taken to extend one half the length of motion vector 508 and to point in the same direction. Segment 506 is displaced by this interpolated motion vector 510 and placed in the intermediate frame 504.

In other embodiments, other methods of interpolating motion vectors may be used. Preferably, however, the proportionate length of the interpolated motion vector relative to the original motion vector should equal the proportion of time elapsed between the first frame and the intermediate frame (relative to the time elapsed between the first and second original frames from the progressive sequence).

2.5 Exposed Areas

In step 750, exposed areas that remain after displacing segments to construct the intermediate frame are filled. Exposed areas may arise in a number of ways. Most typically, two or more segments will move apart and thus leave an area between them that is unfilled by any segment displaced from the previous frame. Also, new objects that appear in a later frame will not be covered by any of the segments displaced from the previous frame. These regions with new information will create exposed areas in the intermediate frame as well. Furthermore, some segments from the previous frame may not realize a sufficient match in the later frame, for instance because they become occluded, and they are thus excluded from the construction of the intermediate frame. But the regions corresponding to these segments may no longer be fully occluded in the intermediate frame, at which only partial motion has occurred, so exposed areas may be introduced.

In some cases, exposed areas will be thin or spidery elongated areas, especially when small cracks open between segments with differential motion. Since a matching strategy will preferably be used to fill the exposed areas, it is useful to first break them into smaller pieces, cutting off narrow strands. Otherwise, using a motion vector to fill an extended exposed area is unlikely to provide an accurate fill along the full extent of the exposed area. For instance, exposed areas may be broken into pieces with aspect ratios (ratio of length to width) below some threshold. One method for cutting extended regions into smaller regions along natural division lines, which is suitable for this purpose, appears in Holt I.

In the preferred embodiment, motion vectors are used to fill the resulting (perhaps subdivided) exposed areas with regions of the same shape in either the previous or the following frame. In this embodiment, the motion vector for an exposed area is inferred from the motion of the displaced segments that neighbor that area in the constructed intermediate frame. If all of these neighbors move consistently, then their motion vector (or an average of their motion vectors in case they are not exactly alike) is used for the exposed area. If, however, there is a wide spread in the neighboring motion vectors, then the vector of smallest extent is used for the exposed area. The reasoning behind this choice is that background regions that are revealed by divergent motion are more likely to move less than foreground objects, and exposed areas are likely to correspond to revealed background regions.

Once the vector for an exposed area has been chosen, a decision must be made whether to fill that exposed area by displacing a region from the past frame or from the future frame. This decision depends primarily on identifying the type of motion that created the exposed area.

Figure 6A:
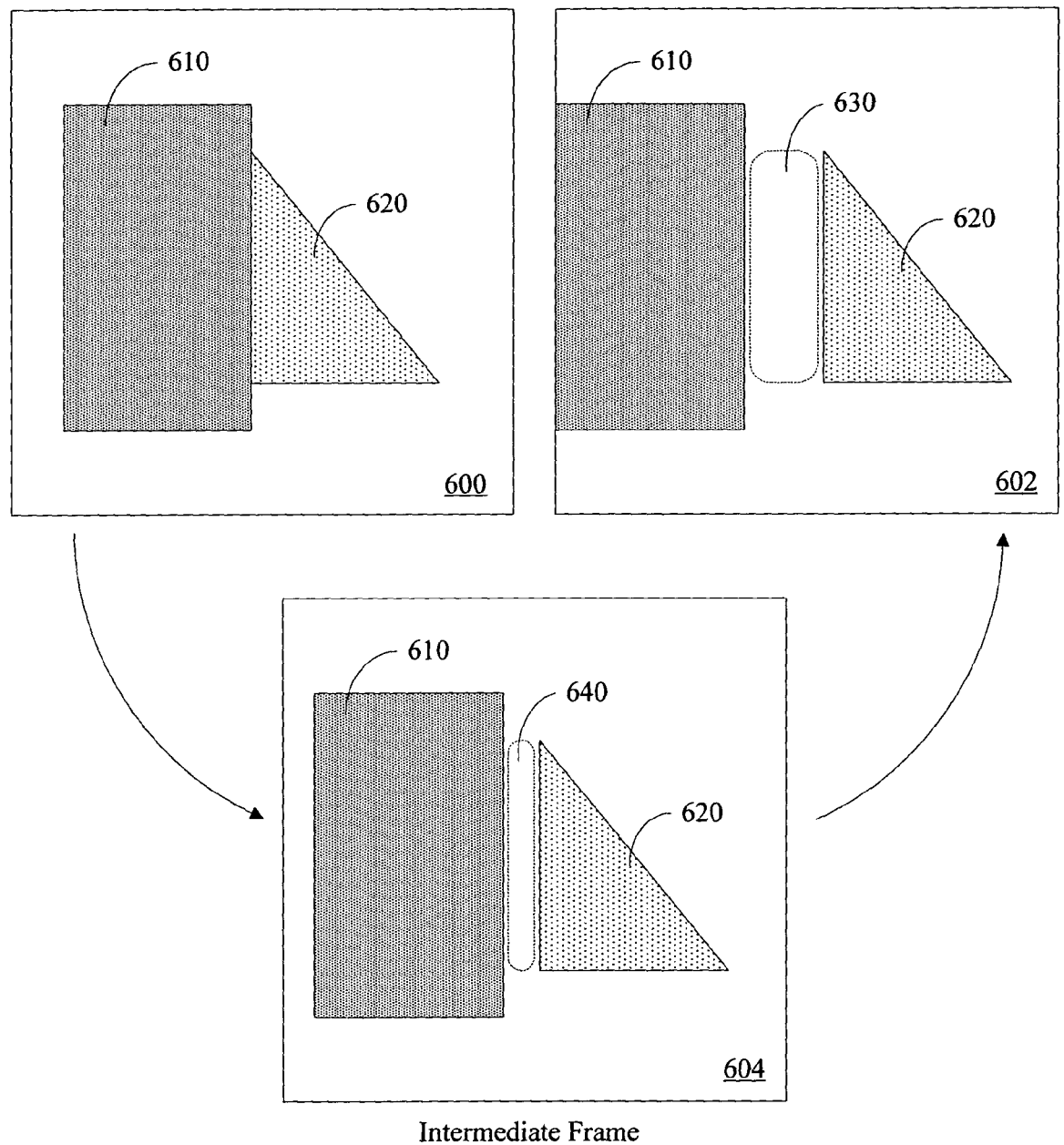
FIG. 6a is an illustration of an exposed area resulting from divergent segment motion.

FIG. 6a illustrates an exposed area resulting from divergent motion between two segments. A frame 600 shows two segments: a rectangle 610 and a triangle 620. A next frame 602 shows that the rectangle 610 and the triangle 620 have moved apart, revealing an area 630 that is not covered by any segments from frame 600. Interpolated motion vectors for the segments in frame 600 are used to interpolate an intermediate frame 604. Note that while segments 610 and 620 are closer together in frame 604, an exposed area 640 still exists between them. The exposed area 640 is most likely to be a portion of the larger area 630 revealed in frame 602, so it makes sense to use the actual known data for area 630 in the later frame 602 to fill the exposed area 640 in the intermediate frame.

Figure 6B:
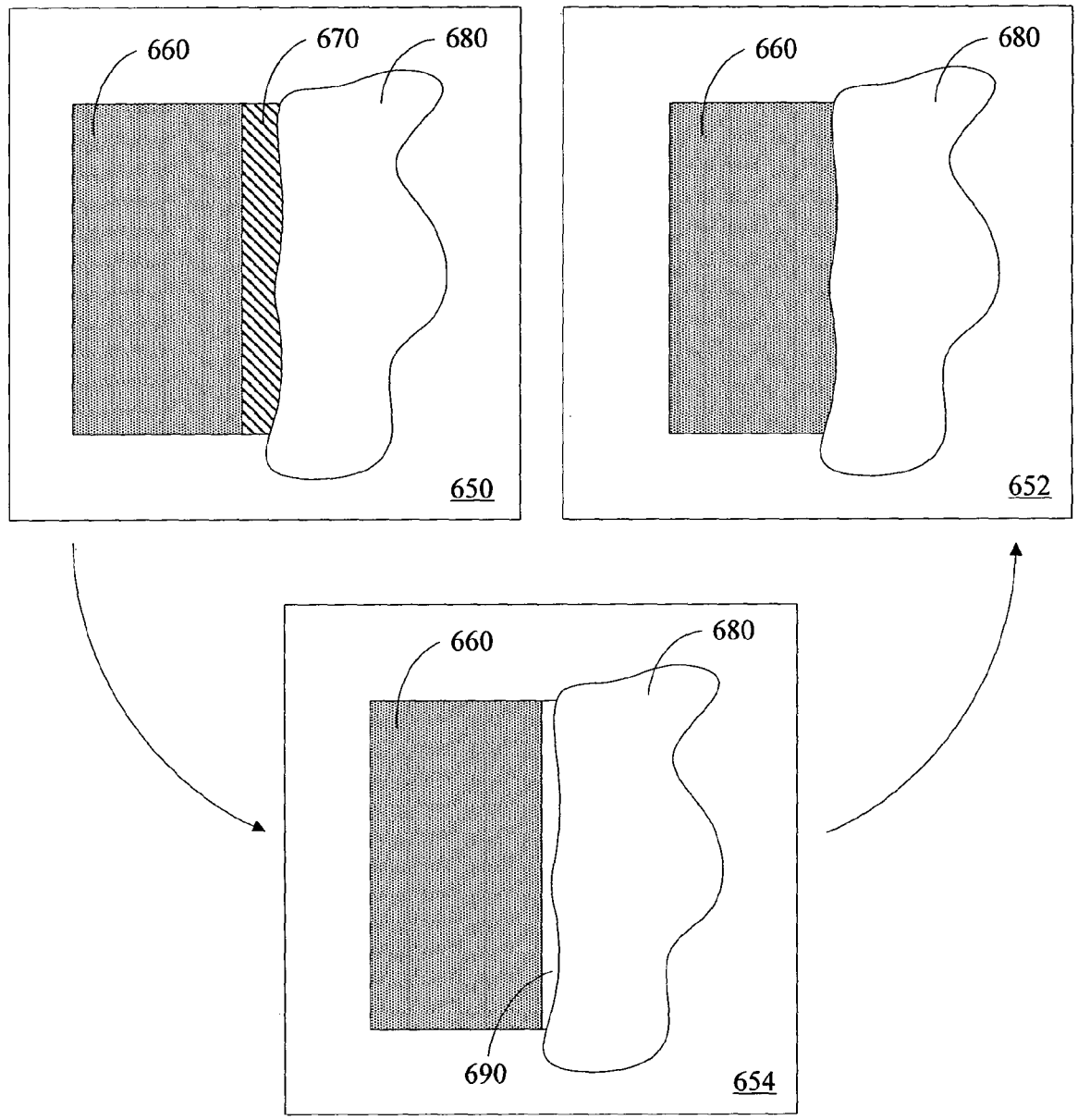
FIG. 6b is an illustration of an exposed area resulting from convergent segment motion.

FIG. 6b illustrates an exposed area resulting from convergent motion between segments causing an unmatched segment. A frame 650 shows three segments: a rectangle 660, a sliver segment 670, and a curved segment 680. A next frame 652 shows that rectangle 660 has converged toward segment 680 and that the sliver segment 670 is no longer visible. Since no area corresponding to segment 670 exists in frame 652, no motion vector is assigned to segment 670 and segment 670 cannot be used to construct an intermediate frame 654. Interpolated motion vectors for the segments in frame 650 that are assigned motion vectors are used to interpolate the intermediate frame 654. Since rectangle 660 has only moved half of its distance toward segment 680 in the intermediate frame. 654, the two segments do not touch and a thin exposed area 690 appears between them. This exposed area 690 does not appear in frame 652 because of the convergence of segments 660 and 680, but it likely corresponds to part of the sliver segment 670 in frame 650. It thus makes the most sense to use the motion vector to fill exposed area 690 using data from the previous frame 650 in this case.

In the preferred embodiment, a decision whether to fill an exposed area using the previous frame or the next frame is made by checking to see whether the area in the next frame corresponding to the exposed area displaced by its motion vector is also an exposed area. If it is also an exposed area, then this next frame is used to fill the exposed area in the intermediate frame. However if there is no exposed area in this location in the next frame, then the previous frame is used to fill the exposed area in the intermediate frame.

In alternative embodiments, other methods may be used to fill exposed areas. These methods represent a range of computational complexities that may be appropriate for different applications requiring different levels of presentation quality.

In one embodiment, an additional criterion is used to bias the direction from which an exposed area is filled. This criterion is helpful because a smaller exposed area in the intermediate frame could be filled using different portions of the larger corresponding exposed area in the later frame, but one portion of this larger corresponding exposed area might provide the best match. In the case where a corresponding exposed area exists in the later frame, the portions of this exposed area nearest each of its neighboring segments are compared to the corresponding neighboring segments. The portion providing the closest match to its nearest neighbor is selected as the best portion of the larger exposed area with which to fill the smaller exposed area in the intermediate frame. This information may be used to bias the motion vector that is assigned to the exposed area in the intermediate frame, or it may be used to replace that motion vector altogether with a vector appropriate for filling the exposed area with the selected portion of the corresponding exposed area in the later frame.

In another embodiment, motion compensation is used to adjust for motion throughout the whole frame, such as for instance a camera pan. In this case, the average of the interpolated motion vectors for all segments in the previous frame is used as a motion vector for each exposed area. The average may be for instance a mean or a median. This average motion vector is used to select an area in the previous frame with which to fill each exposed area. Alternatively, this average motion vector is used to select an area in the following frame with which to fill each exposed area.

In another embodiment, exposed areas are filled with the data from the same location in the previous frame, i.e. no motion vectors are used. Alternatively, exposed areas are filled with the data from the same location in the following frame.

In another embodiment, color data for the segments neighboring the exposed area might be used to fill the exposed area, for instance by a progressive flood fill.

2.6 Alternative Embodiments

A variety of alternative embodiments and obvious alterations of the details described above with reference to the preferred embodiment will be apparent to one with ordinary skill in the relevant art. Several alternative embodiments are listed here, but this list should not be construed as limiting the potential ways of embodying the present invention.

In one embodiment, the later of two consecutive frames is segmented, and the motion of these segments is estimated in reverse time. An intermediate frame is thus constructed by interpolating motion vectors in reverse time and by displacing segments from the later frame in accordance with these motion vectors. Fields of opposite parity are extracted from the intermediate frame and the later frame, respectively.

In another embodiment, more than one intermediate frame is constructed so that more than two fields may be extracted from each pair of consecutive progressive frames. Motion vectors are interpolated for each intermediate frame according to the proportion of time elapsed between the first frame and that intermediate frame (relative to the time elapsed between the first and second original frames from the progressive sequence). Exposed areas are filled as before. Fields are extracted from the constructed sequence of frames, including intermediate frames, to produce an interlaced video sequence. A progressive sequence with N frames per second can thus be converted to an interlaced sequence with 3N, 4N, etc. fields per second.

In another embodiment, fields are comprised of alternate vertical columns rather than horizontal rows.

In another embodiment, a progressive sequence is interlaced into a format with at least three fields.

In another embodiment, the progressive sequence is a compressed encoded progressive sequence that is interlaced as it is decoded. In this case, an encoder performs motion estimation for objects and encodes motion vectors as part of the compressed sequence. A decoder then decodes and uses these motion vectors and other information to reconstruct the progressive frames. The decoder also uses the decoded motion vectors to interpolate motion vectors for the intermediate frames from which interlaced fields are extracted.

In another embodiment, a different strategy is used for interpolating a field between two frames when the two frames occur at the boundary between two scenes. If a scene change is detected between the two frames, then the second frame may be completely unrelated to the first frame, so motion estimation is not possible. In this case, the field occurring between the two frames' timestamps may simply be extracted from the first frame using the frame separation technique. Alternatively, an intermediate frame can be constructed using motion vectors derived from past motion of segments between the previous two frames, and the intermediate field can be extracted from this intermediate frame as before. In this embodiment, exposed areas should be filled only with reference to the previous frame since the next frame represents an unrelated scene.

2.7 Interlacing apparatus

Figure 8:
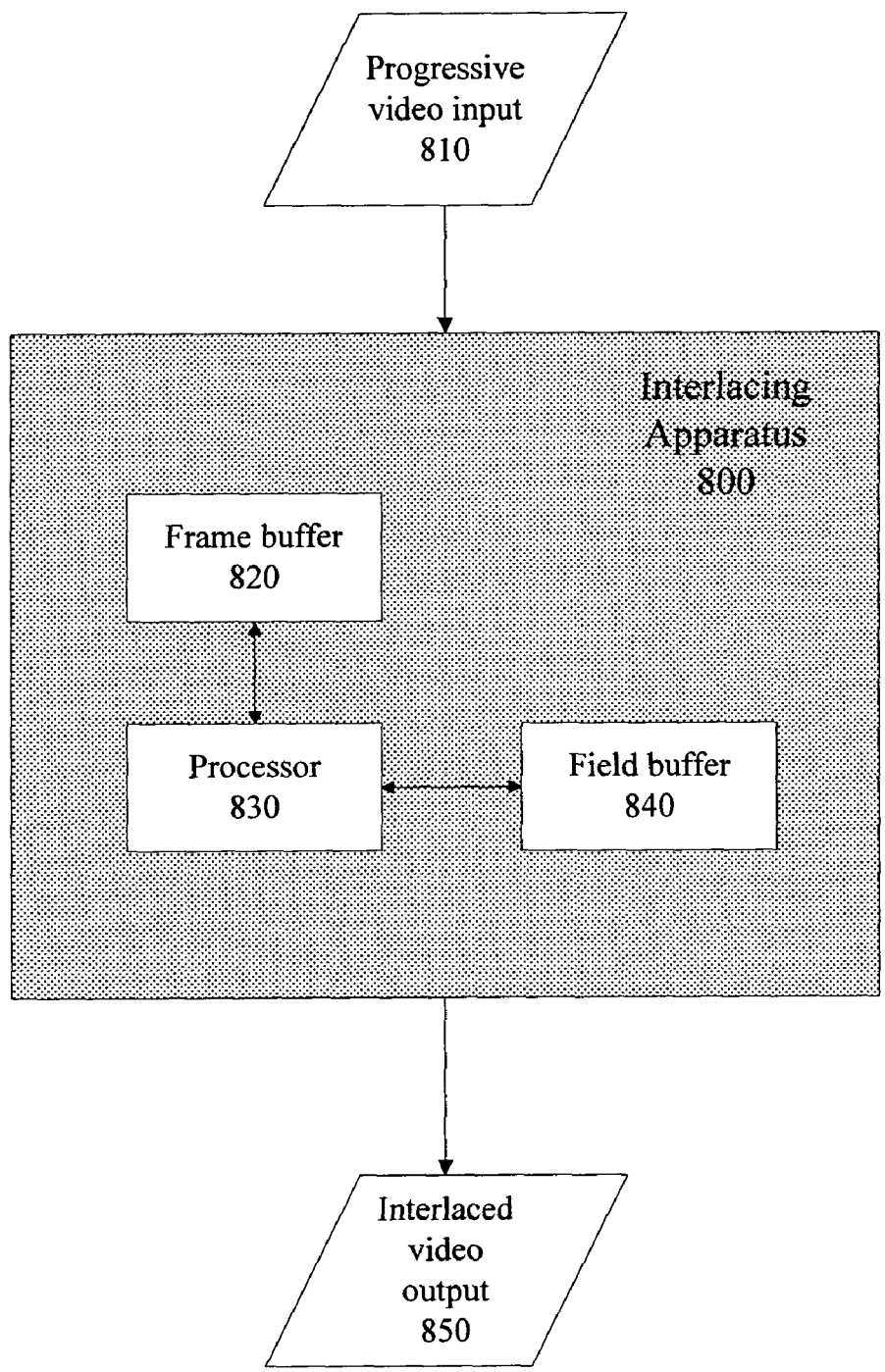
FIG. 8 is a block diagram of an apparatus for interlacing a progressive video sequence.

FIG. 8 is a high-level block diagram for an interlacing apparatus 800. The apparatus 800 may receive a progressive video sequence 810 as input, and it produces an interlaced video sequence 850 as output.

The interlacing apparatus 800 comprises a frame buffer 820, a processor 830, and a field buffer 840. The frame buffer stores a plurality of consecutive progressive frames that are used to produce interlaced fields. The processor 830 takes at least two consecutive frames from the frame buffer 820 and uses object motion estimation to produce at least one intermediate frame. It stores the at least one intermediate frame in the frame buffer 820. The processor 830 extracts at least two fields from the sequence of frames, including the at least one intermediate frame, and it stores the extracted fields in the field buffer 840. The processor 830 may repeat the process for subsequent sets of at least two consecutive progressive frames so that an entire progressive video sequence may be converted into an interlaced sequence.

In a preferred embodiment, the processor 830 carries out the preferred method for interlacing described in the preceding sections. In alternative embodiments, the processor 830 can carry out any of the disclosed alternative methods or their equivalents, which are readily conceived by one with ordinary skill in the relevant art.

The interlacing apparatus 800 may be realized as a set of instructions for a computer processor, such as for example the processor in a personal computer (PC). The de-interlacing apparatus 800 may also be realized as a hardware device, comprising a system on a chip (SoC) or as one component of an SoC.

3 Conclusions, Ramifications, and Scope

The disclosed method and apparatus for interlacing a progressive video sequence provide a significant advance over the known art. Existing techniques for extracting fields from progressive frames fail to adequately recreate the smooth motion that should occur during the temporal lags between fields. The present invention exploits object-based motion estimation to interpolate motion between fields and to displace objects to their correct positions in fields that occur between two frames of the progressive sequence. This motion adjustment allows the realization of an intended advantage of interlaced video: motion appears smoother because fields expressing incremental motion appear more frequently than the frames of the original progressive sequence.

Reference throughout this specification to "one embodiment" or "an embodiment" or the like means that a particular feature, structure, or characteristic described in connection with the embodiment is included in at least one embodiment of the present invention. Thus, the appearances of the phrases "in one embodiment" or "in an embodiment" or the like in various places throughout this specification are not necessarily all referring to the same embodiment. Furthermore, the particular features, structures, or characteristics may be combined in any suitable manner in one or more embodiments.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method for interlacing a progressive video sequence to produce an interlaced video sequence of alternating odd and even fields, the method comprising:
   obtaining at least two consecutive frames of a progressive scan video sequence;
   segmenting at least one of said frames into constituent objects;
   estimating a motion of said constituent objects between a first frame and a second frame of said frames;
   using the estimated motion for each object between the first and second frames to determine an interpolated position for each object in an intermediate frame;
   using the interpolated position for each object to construct the intermediate frame;
   extracting a first alternating field from the first frame; and
   extracting a second alternating field from the intermediate frame,
   wherein the first and second alternating fields comprise the odd and even fields of the interlaced video sequence.

2. The method of claim 1, wherein the odd field contains image data of odd numbered rows of a frame, and the even field contains image data of even numbered rows of a frame.

3. The method of claim 1, wherein the first and second fields comprise fields of even and odd columns the odd field contains image data of odd numbered columns of a frame, and the even field contains image data of even numbered columns of a frame.

4. The method of claim 1, further comprising:
   filling areas of the intermediate frame that are exposed by the interpolated motion for each object.

5. The method of claim 4, wherein if the exposed area in the intermediate frame corresponds to an exposed area in the next frame, then data from the next frame is used to fill the exposed area in the intermediate frame.

6. The method of claim 5, wherein if the exposed area in the intermediate frame does not correspond to an exposed area in the next frame, then data from the first frame is used to fill the exposed area in the intermediate frame.

7. The method of claim 4, wherein color data for neighboring objects is used to fill the exposed area in the intermediate frame.

8. The method of claim 1, further comprising calculating and using an average of the estimated motion for each object between frames in constructing the intermediate frame.

9. The method of claim 1, further comprising comparing the estimated motion for a first object with estimated motions for neighboring objects to determine a consistency of the estimated motions.

10. The method of claim 1, further comprising comparing the estimated motion for a set of pixels with estimated motions for the set of pixels in a nearby frame to determine a consistency of the estimated motions.

* * * * *